April 24, 1962

C. E. WIRSING, JR 3,030,703

METHOD OF MAKING BRAZED HONEYCOMB STRUCTURES

Filed Sept. 3, 1957

INVENTOR.
CHARLES E. WIRSING JR.

BY Julian G. Renfro

ATTORNEY

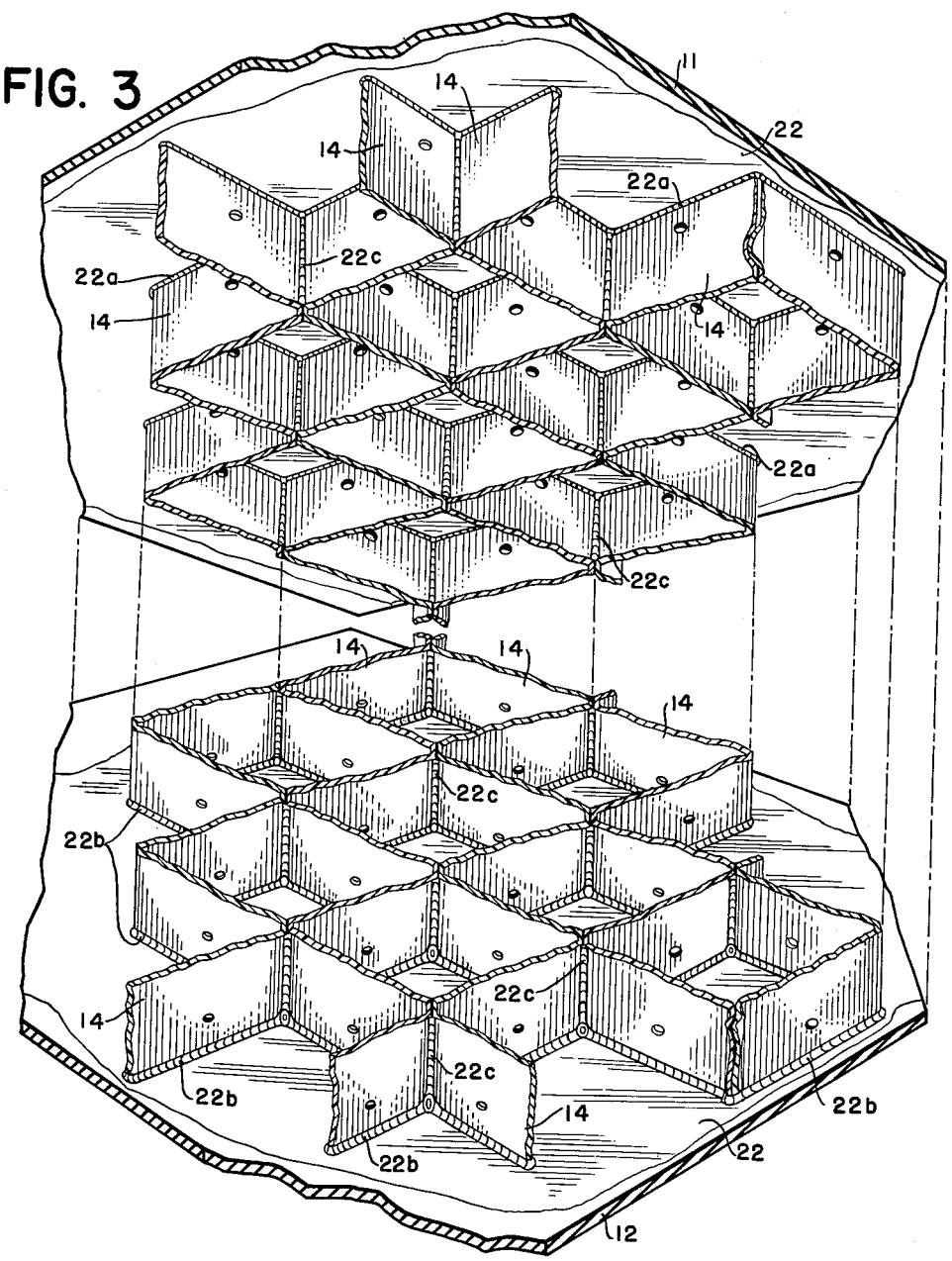

United States Patent Office 3,030,703
Patented Apr. 24, 1962

3,030,703
METHOD OF MAKING BRAZED HONEYCOMB STRUCTURES
Charles E. Wirsing, Jr., Baltimore, Md., assignor to Martin-Marietta Corporation, a corporation of Maryland
Filed Sept. 3, 1957, Ser. No. 681,796
10 Claims. (Cl. 29—471.1)

This invention relates to composite honeycomb structures, and in particular to the method of making such structures from corrosion-resistant metal by brazing a top and bottom skin of the metal to a honeycomb core of the metal.

The structural requirements of modern high speed aircraft have brought about the development of composite honeycomb structures, and in particular honeycomb structures fabricated from such corrosion-resistant metals as stainless steels, nickel alloys and titanium alloys. These honeycomb structures most commonly comprise a top and bottom skin of the corrosion-resistant metal separated from, but connected to, each other by an intermediate honeycomb core of the corrosion-resistant metal to which the top and bottom skins are secured by a brazing metal or alloy. The resulting composite honeycomb structure is characterized by a resistance to corrosion inherent in the material of construction and by a very high strength to weight ratio that is retained by the honeycomb structure at temperatures far in excess of those attained by comparable structures heretofore employed in aircraft construction.

These honeycomb structures are customarily manufactured by assembling a composite sandwich consisting of the top skin of the corrosion-resistant metal, a layer of a brazing metal or alloy, the honeycomb core formed from a plurality of mutually contacting honeycomb elements of corrosion-resistant metal configured to define therebetween a plurality of honeycomb cells, a second layer of brazing metal or alloy and the bottom skin of corrosion-resistant metal, followed by heating the resulting composite sandwich to the temperature at which the brazing metal flows and brazes the various members of the sandwich together. During the brazing operation the molten brazing metal is drawn, or is supposed to be drawn, by capillary attraction from the initial layers of the brazing metal disposed against the inner surfaces of the top and bottom skins into the interstices and the corners formed at the lines of contact between the under surface of the top skin and the upper edges of the honeycomb core, at the lines of contact (i.e. the nodal joints) between the various honeycomb elements that make up the honeycomb core, and at the lines of contact between the upper surface of the bottom skin and the under edges of the honeycomb core. Thus drawn by capillary action into the aforementioned interstices and corners, the molten brazing metal forms fillets of the metal which ideally should be of uniform size throughout the brazed honeycomb structure. However, it has been found that, despite the utmost care in carrying out the brazing operation, it is impossible to practice to obtain a brazed honeycomb structure in which the size of the fillets of brazing metal is uniform throughout the structure. On the contrary, extreme difficulty has been encountered in controlling the flow of the brazing metal so that the metal will flow and wet the surface of the corrosion-resistant metal readily and yet not flow so freely that an excessive amount of the brazing metal will be transferred from the top skin to the bottom skin of the honeycomb structure. In particular, a difficulty almost universally encountered even in the best prior art practice is the tendency of the molten brazing alloy disposed against the top skin of the honeycomb structure to gather into drops of molten alloy which, in turn, drip or run down the sides of the honeycomb core from the top skin to the bottom skin, thus robbing the top skin of necessary brazing alloy.

It has been found that an accurate measure of the transfer of molten brazing metal from the top skin to the bottom skin is the ratio between the average size of the fillet of brazing metal formed between the top skin and the honeycomb core (hereinafter referred to as the "top fillet") and the average size of the fillet of brazing metal formed between the bottom skin and the honeycomb core (hereinafter referred to as the "bottom fillet"). Ideally, the size of the fillets of brazing metal should be uniform throughout, and therefore the ideal ratio between the average size of the top fillet and the average size of the bottom fillet is 1:1. Heretofore the ratio between the average size of the top fillet and the average size of the bottom fillet have not uncommonly reached values of 1:15 or higher, which ratio clearly represents an excessive amount of transfer of brazing metal from the top skin to the bottom skin of the honeycomb structure; and ratios in the order of about 1:5 are the lowest that have been obtained by means of the best prior art practice. Accordingly, to determine the cause for the unsatisfactory results obtained by the best prior art practice, and in an endeavor to develop brazing alloys and/or brazing techniques that would more nearly approach the aforementioned ideal ratio in average fillet size, I undertook an extensive investigation in which a large number of brazing alloys and brazing techniques were evaluated.

In my investigation I discovered that the uniformity in the size of the fillets of brazing metal formed during the brazing of the honeycomb structure is dependent upon the pre-braze preparation of the surface of the corrosion-resistant members of the structure, upon the selection of the brazing metal, upon the control of brazing conditions, and particularly upon a quality or property of the brazing metal referred to herein as the "flow characteristic" of the metal. I further discovered that the flow characteristic of the brazing metal is a function of the self-fluxing action of the molten metal, the viscosity and surface tension of the molten metal, the physical disposition or positioning of the brazing alloy or alloys employed as the brazing metal with respect to the honeycomb structure to be brazed, and the relative flow temperatures of these brazing alloys. The self-fluxing action of the brazing metal is important in order to provide a clean metal surface at the joints to be brazed so that the brazing metal will readily wet and tightly adhere to the underlying metal surfaces. Accordingly, the brazing alloys employed in the practice of my invention are "self-fluxing" in that they contain an ingredient that at brazing temperatures dissolves or otherwise removes from the honeycomb structure to be brazed the metal oxide film with which the corrosion-resistant metals ordinarily employed in the structure (e.g. stainless steels, nickel alloys and titanium alloys) are normally coated. Given a clean surface which the molten brazing metal will wet and to which it will adhere, I found that the flow characteristic of the molten metal is in part dependent upon the viscosity and the surface tension of the molten metal which, in turn, are largely dependent upon the composition of the brazing alloy or alloys employed as the brazing metal. Finally, I discover that physical disposition of the brazing alloy or alloys with respect to the honeycomb structure to be brazed and the relative flow temperatures of these alloys (i.e. a temperature roughly equivalent to the melting point of an alloy) are essential factors in determining the flow characteristic of the brazing metal. A brazing metal having an optimum flow characteristic will form fillets of brazing metal of more nearly uniform size throughout the brazed honeycomb structure and will minify the transfer of brazing metal from the top skin to the bottom skin of the honeycomb structure.

As a result of my investigation, I have devised a new brazing technique by which, in conjunction with the use of novel brazing alloys of specified properties which I have discovered, optimum flow characteristics of the brazing metal are obtained. Accordingly, my invention comprises an improvement in the method of making a composite honeycomb structure of the corrosion-resistant metal whereby the uniformity of the brazed connections between the top skin and the honeycomb core, between the various elements of the honeycomb core itself, and between the honeycomb core and the bottom skin is greatly improved, and whereby the ratio of the average size of the top fillet to the average size of the bottom fillet is maintained at a value of not more than about 1:3, and in most instances at less than 1:2, a remarkably close approach to the ideal ratio of 1:1. The improved method of my invention comprises positioning a layer of a first brazing alloy having self-fluxing action against and in contact with the inner surfaces of the top and bottom skins of the honeycomb structure and disposing a layer of a second brazing alloy against and in contact with the inner surface of each layer of said first brazing alloy and the adjacent edges of the honeycomb elements of the honeycomb core, followed by heating the composite honeycomb sandwich to the brazing temperature. The first brazing alloy advantageously has a flow temperature substantially the same as the initial heat treating temperature of the corrosion-resistant metal and the second brazing alloy has a flow temperature of at least 50° F. higher than the flow temperature of said first brazing alloy. The two brazing alloys have compositions such that when molten they will readily form a third brazing alloy having the aforementioned self-fluxing action, a flow temperature no higher than the aforementioned brazing temperature, and a flow characteristic such that the ratio between the average size of the top fillet and the average size of the bottom fillet is not more than 1:3.

My invention will be better understood from the following description taken in conjunction with the accompanying drawing of which—

FIG. 3 is a perspective view of the brazed honeycomb structure with the upper portion broken away from the lower portion thereof to show the nature of the brazed joints formed.

Figure 1:
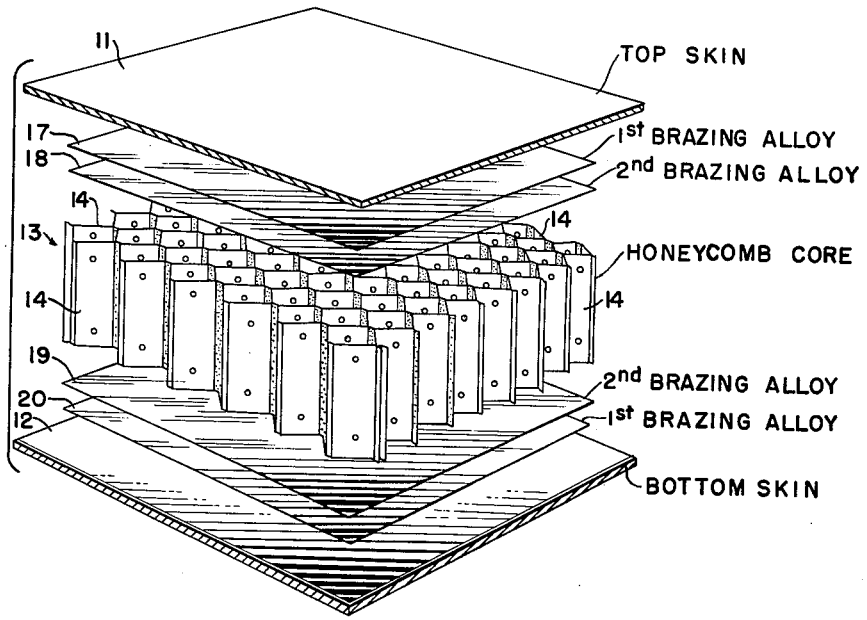
FIG. 1 is an exploded perspective view of the composite honeycomb structure prior to brazing.
Figure 2:
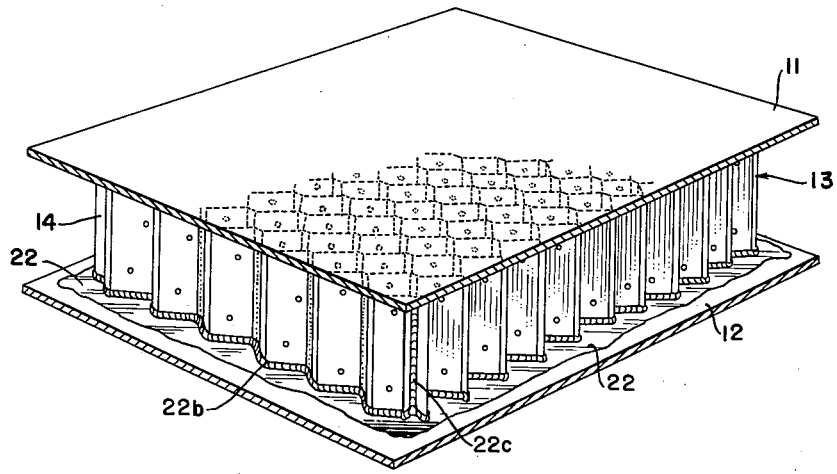
FIG. 2 is a perspective view of the honeycomb structure subsequent to the brazing operation.

The honeycomb structures to which my invention relates comprise, in general a metal top skin 11 and a metal bottom skin 12 separated from but connected to each other by an intermediate metal honeycomb core 13, the honeycomb core 13 being formed from a plurality of metal honeycomb elements 14 configured so that the elements 14 between them define a plurality of honeycomb cells. For example, in the honeycomb structure shown in the drawing the honeycomb elements 14 have a substantially zig-zag configuration so that when these elements are assembled as shown they will between them define a plurality of four-sided honeycomb cells. Many other conventional configurations of the honeycomb elements 14 are useful. Upon assembly of a number of the honeycomb elements 14 to form a honeycomb core 13, each element 14 is secured to each of the adjoining honeycomb elements 14 at the nodal joints of the honeycomb cells by means of spot welding or some equivalent fastening technique. Thus, as shown in FIG. 1, prior to the brazing operation the assembly of honeycomb elements 14 that form the honeycomb core 13 are fastened together by means of the aforementioned spot-welding or equivalent technique but are not as yet secured to one another by brazing metal. In the course of the brazing operation, as shown in FIGS. 2 and 3, the assembly of honeycomb elements 14 that make up the honeycomb core 13 are securely brazed to one another, and to the top skin 11 and the bottom skin 12 of the honeycomb structure by the brazing metal.

The honeycomb structure is preferably fabricated from corrosion-resistant and heat-resistant metals such as stainless steels, corrosion-resistant steels, heat-resistant steels, nickel alloys, titanium and titanium alloys. For example, typical stainless steels and nickel alloys that can be employed in the manufacture of honeycomb structures in accordance with my invention include those having the commercial designations 19–9DL, 17–7PH, 15–7MO, AM–350, A286 and 422; and typical titanium alloys include those having the designations 6A14V, A110AT, RC70 and B120VCA. The top skin 11 and the bottom skin 12 can be of any suitable size and configuration that will adapt them for their ultimate use, and the thickness of these members is dependent upon the specific material of construction employed and the ultimate use of the honeycomb structure. For example, in a typical honeycomb structure, the top and bottom skins are advantageously formed from corrosion-resistant sheet metal having a thickness of the order of between about 0.005 and .250 inch. Similarly, the thickness of the metal sheet from which the honeycomb elements 14 are fabricated is dependent upon the material of construction and the ultimate use of the honeycomb structure. For example, in a typical honeycomb structure the honeycomb elements 14 which make up the honeycomb core 13 are advantageously fabricated from a metal sheet or foil having a thickness of the order of about .0005 to .005 inch.

As hereinbefore pointed out, the corrosion-resistant metals commonly employed in the manufacture of honeycomb structures are normally coated with a thin film of metal oxide which interferes with the ability of the molten brazing metal to wet and to adhere to the surface of the corrosion-resistant metal. Therefore, in order to provide a clean metal surface to which the brazing metal can adhere, it is necessary to remove this oxide film from the surface of the corrosion-resistant metal prior to or during the brazing operation. I have found that this can best be done by first treating the surface of the corrosion-resistant metal with an acid pickling solution (e.g. a mixture of dilute mineral acids such as sulphuric acid, nitric acid, hydrofluoric acid, and the like) followed by careful drying of the pickled metal parts advantageously in a vacuum.

The metal oxide film removed by the pickling treatment is immediately replaced by a fresh film of the oxide that forms on the surface of the corrosion-resistant metal. However, this fresh oxide film is more nearly uniform and somewhat thinner than the original oxide film, and it is readily removed from the surface of the corrosion-resistant metal members during the brazing operation by the use of a self-fluxing brazing metal (i.e. brazing metal containing an ingredient that will dissolve or otherwise remove the oxide film from the surface corrosion-resistant metal). The specific "fluxing" ingredient of the brazing metal will depend upon the particular corrosion-resistant and brazing metals employed. By way of example, I have found that from about 0.2% to 0.5% by weight of lithium present in the silver base alloys commonly employed as brazing metals for stainless steels substantially completely removes the metal oxide film from the surface thereof so that the silver base alloy will readily wet and adhere to the underlying surface of the corrosion-resistant stainless steel. Furthermore, in order to minify the formation of the metal oxide film on the surface of the corrosion-resistant metal during the course of the brazing operation, it is necessary to carry out the brazing operation in an atmosphere that is substantially inert (i.e. non-oxidizing) or reducing to the metal at the brazing temperature. Accordingly, I find it advantageous to carry out the brazing operation of my invention in a furnace or other suitable apparatus in which an atmosphere of argon or some other inert gas, or reducing gas such as hydrogen, or a vacuum can be maintained.

A further important consideration in the practice of my invention is the fact that the corrosion-resistant metals employed in the honeycomb structure normally require heat treatment of various kinds (e.g. annealing, chilling, hardening, tempering and the like) in order to develop to a maximum degree the physical properties (e.g. strength) desired of the metal. The usual heat treatment is designed to achieve precipitation hardening of the corrosion-resistant metal and involves heating the metal to its annealing or conditioning temperature, followed by cooling or chilling the metal and reheating to a temperature somewhat below the aforementioned annealing or conditioning temperature. Obviously, to prevent disintegration of the brazed honeycomb structure, the brazing metal employed must have a flow temperature (i.e. a temperature roughly equivalent to the melting point of the brazing metal) no lower than the highest temperature to which the honeycomb structure will be subjected subsequent to the brazing operation. Moreover, the temperatures employed during the initial annealing or conditioning heat treatment of the corrosion-resistant metal are usually the highest temperatures to which honeycomb structure is subjected in the course of the fabrication or in its service life. Accordingly, the flow temperature of the brazing metal advantageously is such that the brazing operation can be carried out at the same time that the initial annealing or conditioning heat treatment step of the corrosion-resistant metal is carried out.

After preparation of the surface of the corrosion-resistant metal as described, the composite honeycomb sandwich is assembled in accordance with my invention as shown in an exploded view of the sandwich in FIG. 1 of the drawing. The composite sandwich consists of the top skin 11, a layer 17 of a first self-fluxing brazing alloy disposed against the under surface of the top skin 11, a layer 18 of a second brazing alloy disposed against the under surface of the layer of the first brazing alloy, the honeycomb core 13 disposed against the under surface of the layer of the second brazing alloy, a layer 19 of the second brazing alloy disposed against the under surfaces of the honeycomb core 13, a layer 20 of the first brazing alloy disposed against the under surface of the layer 19 of the second brazing alloy, and the bottom skin 12 disposed against the under surface of the layer 20 of the first brazing alloy. The first brazing alloy has a flow temperature advantageously substantially the same as or slightly lower than the initial heat treating temperature of the corrosion-resistant metal and has a composition such that when molten it will readily wet and adhere to a clean surface of the corrosion-resistant metal. The second brazing alloy has a flow temperature slightly higher (about 50° F. higher) than the initial heat treating temperature of the corrosion-resistant metal and at least 50° F. higher than the flow temperature of the first brazing alloy, and it has a composition such that at the brazing temperature it will readily be dissolved by and mix with the molten first brazing alloy to form a third self-fluxing brazing alloy or metal having a flow temperature no higher than the brazing temperature and an optimum flow characteristic as hereinafter more fully described. The thickness of each of the layers 17, 18, 19 and 20 of the two brazing alloys is dependent upon the amount of brazing metal that is required to completely braze the composite sandwich together in accordance with my invention. For example, in a typical honeycomb sandwich each of the layers 17, 18, 19 and 20 is advantageously a sheet or foil of the brazing alloy having a thickness of the order of about .0005 to .005 inch.

Following assembly of the composite honeycomb sandwich as described, the resulting sandwich is heated in a substantially inert or some equivalent atmosphere to the brazing temperature of the brazing alloys, namely, a temperature somewhat between the flow temperature of the first brazing alloy and the flow temperature of the second brazing alloy, whereupon the layers 17 and 20 of the first brazing alloy melt and, due to the self-fluxing action of this alloy, clean and wet the inner surfaces of the top skin 11 and the bottom skin 12 against which these layers are disposed. Due to the difference of at least 50° F. between the flow temperature of the first brazing alloy and the flow temperature of the second brazing alloy, there is a significant time delay between the melting of the first alloy and the melting of the second alloy. This time delay is sufficient to insure that the two layers 17 and 20 of the molten first alloy will be held in their initial positions against the top and bottom skins 11 and 12 by the as yet unmelted layers 18 and 19 of the second alloy until the molten first alloy thoroughly cleans and wets the adjacent surfaces of the said top and bottom skins. The as yet unmelted layer 18 of the second brazing alloy furthermore prevents the molten layer 17 of the first brazing alloy from gathering into drops of molten alloy which, if allowed to form, would drip or run down the sides of the core 13 from the top skin 11 to the bottom skin 12. The layers 18 and 19 of the second brazing alloy then melt and mix with (or are dissolved by) the layers 17 and 20, respectively, of the molten first brazing alloy to form a third brazing alloy or metal 22. The third brazing alloy or metal 22 has an optimum flow characteristic that is due to the aforementioned relative positioning of the layers of the first and second brazing alloys and to the aforementioned relative flow temperatures of these alloys, and as a consequence the molten third brazing metal 22 is drawn by capillary attraction substantially uniformly into the corners and interstices formed at the joints or lines of contact between the under surface of the top skin 11 and the adjacent edges of the honeycomb core 13, at the joints or lines of mutual contact between the several honeycomb elements 14 that make up the honeycomb core 13, and at the joints or lines of contact between the upper surface of the bottom skin 12 and the adjacent edges of the honeycomb core 13. Thus, as shown in FIGS. 2 and 3, following the brazing operation the assembly of top skin 11, intermediate honeycomb core 13 and bottom skin 12, and the assembly of honeycomb elements 14 that make up the honeycomb core 13, are securely fastened to one another by the brazing metal 22 that has flowed into the aforementioned corners and interstices during the brazing operation and that has formed substantially uniform fillets 22a, 22b and 22c of brazing metal thereat.

By the practice of my invention I obtain brazed honeycomb structures of maximum strength and utility in which the fillets of brazing metal 22 formed throughout the honeycomb structure are substantially uniform in size. As pointed out hereinbefore, the uniformity in size of the fillets of brazing metal 22, as measured by the ratio between the average size of the top fillets 22a and the average size of the bottom fillets 22b shown best in FIG. 3, is determined by the pre-braze preparation of the various members of the composite honeycomb sandwich, by the brazing conditions themselves, and particularly by the flow characteristic of the brazing metal employed. By control of these essential determining factors in accordance with my invention I am able to make brazed honeycomb structures in which the ratio between the average size of the top fillet 22a of brazing metal and the average size of the bottom fillet 22b of brazing metal is not more than 1:3, and usually is not more than 1:2.

The following example is illustrative but not limitative of the practice of my invention:

A number of specimens of brazed honeycomb structures were prepared in accordance with the best prior art practice and in accordance with the method of my invention. All of the specimen honeycomb structures were identical in all respects except for the brazing alloys and the disposition of these alloys employed therein. The top and bottom skins 11 and 12 of each specimen were formed from identical sheets of a stainless steel containing about 17% Cr and 7% Ni and 1% Al (designated 17-7PH stainless steel), and the honeycomb elements 14 of each honeycomb core 13 were formed from foil of the same stainless steel about 0.002 inch in thickness. Each honeycomb element 14 had a zig-zag configuration such that a plurality of four-sided honeycomb cells approximately one-quarter inch on a side were defined therebetween when a number of the elements 14 were assembled and spot-welded together to form a honeycomb core 13. The surfaces of the stainless steel members of each specimen were prepared for brazing by identical degreasing and acid pickling treatment so that the residual oxide films on these members were substantially identical for all specimens. It has been found that the most satisfactory alloys for brazing 17-7PH stainless steel are silver-base alloys containing from 0.2% to 0.5% by weight of lithium. Accordingly, all of the specimen honeycomb structures were brazed with silver-base alloys containing 0.2% to 0.5% by weight of lithium in addition to other alloying metals. Composite honeycomb sandwiches were assembled as described hereinbefore, the only difference between the various specimens being the specific brazing alloys and the disposition of these alloys employed therein. Each composite honeycomb sandwich was then heated to the conditioning temperature of the stainless steel, namely 1750° F., at which temperature all of the brazing alloys employed were fluid. The heating was carried out in a brazing furnace retort in which an atmosphere of argon was maintained, and in each case was continued for about one-half hour at the conditioning temperature. The resulting annealed and brazed honeycomb structures were then chilled to a temperature of minus 100° F. and held at this temperature for eight hours and were then reheated to a temperature of 950° F. and held at this temperature for one-half hour to complete the precipitation hardening treatment. Each specimen honeycomb structure was then sectioned for macro and metallographic examination. The uniformity and average size of the fillets of brazing metal formed throughout each specimen, and the ratio of the average size of the top fillet to the average size of the bottom fillet, were determined, and the results obtained were compared with those obtained for each of the other specimens.

The three specimen honeycomb structures manufactured in accordance with the best prior art practice in which the average size of the fillets of brazing metal formed were more nearly uniform throughout the honeycomb structure were selected for comparison with specimen honeycomb structures manufactured in accordance with my improved brazing technique. In each of the three specimen honeycomb structures representing the best prior art practice the brazing alloy was in the form of a foil .0025 inch thick disposed in the composite honeycomb sandwich prior to brazing in single layers of the foil positioned between the top skin 11 and the honeycomb core 13 and between the honeycomb core 13 and the bottom skin 12. In the first of these specimen honeycomb structures representing the best prior art practice the brazing alloy was sterling silver modified by 0.2% lithium (i.e. 92.4% Ag, 7.4% Cu and 0.2% Li) and the ratio between the average size of the top fillet and the average size of the bottom fillet was found to be 1:4.96. In the second of the best prior art honeycomb structures the brazing alloy contained 92.37% Ag, 7.37% Cu, and 0.24% Li, and the ratio between the average size of the top fillet and the average size of the bottom fillet was found to be 1:11.4. The brazing alloy employed in the third honeycomb structure was an alloy comprising 89.5% Ag, 9.7% Cu, 0.5% Li, and 0.3% Ni, and upon completion of the brazing operation and precipitation hardening treatment the ratio between the average size top fillet and the average size of the bottom fillet was found to be 1:4.34.

A fourth specimen honeycomb structure was prepared in accordance with the method of my invention. Two silver-base alloys which together comprised the brazing metal were disposed in the composite honeycomb sandwich prior to the brazing operation in the form of two layers of a first brazing alloy one layer of which was positioned against the under surface of the top skin 11 and the other layer of which was positioned against the upper surface of the bottom skin 12, and two layers of a second brazing alloy one of which was positioned against each layer of the first brazing alloy between the first brazing alloy and the honeycomb core 13. Both brazing alloys were in the form of a foil .0012 inch thick. The first brazing alloy had a flow temperature at least 50° F. less than the conditioning temperature of the 17-7PH stainless steel skin and core, namely 1750° F., and the second brazing alloy had a flow temperature at least 50° higher than said conditioning temperature of the stainless steel, namely a flow temperature of 1800° F. The composition of the first brazing alloy was 92.5% Ag, 7% Cu and 0.5% Li, and the composition of the second brazing alloy was 84.5% Ag. 15% Mn, and 0.5% Li. The difference in flow temperature between the first brazing alloy and the second brazing alloy permitted the unmelted foil of the second brazing alloy to hold the molten first brazing alloy against the top and bottom skins of the honeycomb structure until the first alloy wet the surface of these skins. Moreover, the unmelted foil of the silvermanganese alloy prevented the highly fluid molten silver-copper alloy from gathering into drops that would drip or run down the sides of the honeycomb core 13. After an appreciable time delay the layers of the second brazing alloy alloyed with the layers of the first brazing alloy to form a third alloy or metal having a composition of 88.5% Ag, 3.5% Cu, 7.5% Mn and 0.5% Li. Following the brazing operation and precipitation hardening treatment the ratio of the average size of the top fillet to the average size of the bottom fillet to this third brazing alloy was found to be 1:1.8.

In a modification of my invention the third brazing alloy was modified by the addition thereto of 1% nickel having a resulting composition of 88.5% Ag, 3% Cu, 7% Mn and 1% Ni, and 0.5% Li. The ratio between the average size of the top fillet and the average size of the bottom fillet of this brazing alloy was found to be 1:2.2.

The foregoing specific examples illustrate the practice of my invention when the composite honeycomb sandwich is fabricated from 17-7PH stainless steel. As hereinbefore pointed out the invention is equally applicable to the brazing of honeycomb structures fabricated from other corrosion-resistant and heat-resistant metals such as corrosion-resistant steels, high nickel heat resistant super steels, nickel alloys, titanium and titanium alloys. The composition and flow temperatures of the first and second brazing alloys employed to braze a specific composite sandwich will depend on the particular corrosion-resistant or heat-resistant metal employed, and on the annealing or conditioning temperature of this metal. For example, when brazing a stainless steel such as AM350 or a titanium alloy such as 6A14V having a somewhat lower conditioning temperature than the aforementioned 17-7PH stainless steel, the second brazing alloy can be modified by the addition thereto of from 2 to 5% by weight of copper to obtain a second brazing alloy having a flow temperature of about 1750° F. Thus, by adjusting the composition of the two brazing alloys in this manner, a large number of brazing alloys can be obtained having flow temperatures ranging from below 1100° F. to above 1800° F. Accordingly, from the foregoing description of my invention it is apparent that I have made an important contribution to the art to which the invention relates.

I claim:

1. The method of making a metal honeycomb structure, said structure comprising a metal top skin and a metal bottom skin spaced apart from and connected to each other by a metal honeycomb core, which comprises:
   (a) assembling a composite honeycomb sandwich consisting essentially of the metal top skin, a layer of a self-fluxing first brazing alloy in contact with said top skin, a layer of a second brazing alloy in contact with said first brazing alloy, the metal honeycomb core in contact with said second brazing alloy, a layer of the second brazing alloy in contact with said honeycomb core, a layer of the first brazing alloy in contact with said second brazing alloy, and the metal bottom skin of the honeycomb structure in contact with said first brazing alloy, said second brazing alloy having a flow temperature at least 50° F. higher than the flow temperature of said first brazing alloy and having a composition such that said first brazing alloy and said second brazing alloy will readily alloy at a temperature intermediate the flow temperatures of said first and second brazing alloys to form a third brazing alloy having a flow temperature intermediate the flow temperatures of said first and second brazing alloys, and (b) heating the composite honeycomb sandwich to a brazing temperature at least as high as the flow temperature of the first brazing alloy and the third brazing alloy but below the flow temperature of the second brazing alloy for a length of time sufficient to cause said layers of said first alloy to thoroughly wet the adjacent surface of said skins and to form said third brazing alloy and to braze the honeycomb sandwich together, the resulting brazed honeycomb structure being characterized by a ratio between the average size of the top fillet and the average size of the bottom fillet of less than 1:3.

2. The method according to claim 1 in which the top skin, the bottom skin and the honeycomb core are formed of a corrosion-resistant metal selected from the group consisting of stainless steels, high nickel heat-resistant steels, nickel alloys, titanium and titanium alloys.

3. The method of making a brazed honeycomb structure of corrosion-resistant metal, said honeycomb structure comprising a top skin and a bottom skin of the metal spaced apart from but connected to each other by a honeycomb core of the metal and said honeycomb core further comprising a plurality of mutually contacting honeycomb elements of the metal configured to define between said elements a plurality of honeycomb cells, said method comprising assembling a composite sandwich consisting essentially of the top skin, a first layer of a self-fluxing first brazing alloy disposed in contact with said top skin, a first layer of a second brazing alloy disposed in contact with said first brazing alloy, the honeycomb core disposed in contact with said second brazing alloy, a second layer of the second brazing alloy disposed in contact with said honeycomb core, a second layer of the first brazing alloy disposed in contact with said second brazing alloy and the bottom skin disposed in contact with said first brazing alloy, said second brazing alloy having a flow temperature of at least 50° F. higher than the flow temperature of said first brazing alloy, said first and second brazing alloys having compositions such that when molten said first brazing alloy will readily alloy with said second brazing alloy at a temperature below the flow temperature of said second brazing alloy to form a third brazing alloy having a flow temperature intermediate the flow temperatures of said first and second brazing alloys, and heating the composite honeycomb sandwich to a brazing temperature above the flow temperatures of the first and the third brazing alloys but below the flow temperature of the second brazing alloy for a length of time sufficient to cause said first and second layers of said self-fluxing alloy to thoroughly wet the adjacent surfaces of said top and bottom skins, respectively, and form said third brazing alloy, the resulting brazed honeycomb structure being characterized by a ratio between the average size of the top fillet to the average size of the bottom fillet of less than 1:3.

4. The method of making a brazed honeycomb structure of a corrosion-resistant metal selected from the group consisting of stainless steels, nickel alloys and titanium alloys, said honeycomb structure comprising a top skin and a bottom skin of the metal spaced apart from but connected to each other by a honeycomb core of the metal and said honeycomb core further comprising a plurality of mutually contacting honeycomb elements of the metal configured to define between said elements a plurality of honeycomb cells, said method comprising pickling said corrosion-resistant metal members in a mineral acid pickling solution, drying the resulting pickled members, assembling a composite sandwich consisting essentially of the top skin, a first layer of a self-fluxing first brazing alloy disposed in contact with said top skin, a first layer of a second brazing alloy disposed in contact with said first brazing alloy, the honeycomb core disposed in contact with said second brazing alloy, a second layer of the second brazing alloy disposed in contact with said honeycomb core, a second layer of the first self-fluxing brazing alloy disposed in contact with said second brazing alloy and the bottom skin disposed in contact with said first brazing alloy, said second brazing alloy having a flow temperature of at least 50° F. higher than the flow temperature of said first brazing alloy, said first and second brazing alloys having compositions such that when said first brazing alloy is molten it will alloy with said second brazing alloy at a temperature below the flow temperature of said second brazing alloy to form a self-fluxing third brazing alloy having a flow temperature intermediate the flow temperatures of said first and second brazing alloys, said third brazing alloy being characterized by an ability when molten to wet the surface of said corrosion-resistant metal, heating the composite honeycomb sandwich in an inert atmosphere to a temperature above the flow temperature of the first and third brazing alloys but below the flow temperature of the second brazing alloy for a length of time sufficient to cause said first and second layers of said self-fluxing alloy to thoroughly wet the adjacent surfaces of said top and bottom skins, respectively, and form said third brazing alloy, and cooling the resulting brazed honeycomb structure, said brazed honeycomb structure being characterized by a ratio between the average size of the top fillet to the average size of the bottom fillet of less than 1:3.

5. The method of making a brazed honeycomb structure of a corrosion-resistant metal selected from the group consisting of stainless steels, nickel alloys and titanium alloys, said honeycomb structure comprising a top skin and a bottom skin of the metal spaced apart from but connected to each other by a honeycomb core of the metal and said honeycomb core further comprising a plurality of mutually contacting honeycomb elements of the metal configured to define between said elements a plurality of honeycomb cells, said method comprising assembling a composite sandwich consisting essentially of the top skin, a first layer of a self-fluxing first brazing alloy disposed in contact with said top skin, a first layer of a second brazing alloy disposed in contact with said first brazing alloy, the honeycomb core disposed in contact with said second brazing alloy, a second layer of the second brazing alloy disposed in contact with said honeycomb core, a second layer of the first brazing alloy disposed in contact with said second brazing alloy and the bottom skin disposed in contact with said first brazing alloy, said first brazing alloy having a flow temperature below the annealing temperature of the corrosion-resistant metal and said second brazing alloy having a flow temperature at least 50° F. higher than said annealing temperature, said first and second brazing alloys having compositions such that when said first brazing alloy is molten it will alloy with said second brazing alloy at the annealing temperature of said corrosion-resistant metal to form a self-fluxing third brazing alloy having a flow temperature no higher than said annealing temperature, heating the composite sandwich in a substantially non-oxidizing atmosphere to the annealing temperature of the corrosion-resistant metal for about one-half hour to anneal said metal and form said third brazing alloy, said third brazing alloy brazing said composite honeycomb sandwich together.

6. The method of making a brazed honeycomb structure of stainless steel, said honeycomb structure comprising a top skin and a bottom skin of said stainless steel spaced apart from but connected to each other by a honeycomb core of the metal, said honeycomb core comprising a plurality of mutually contacting honeycomb elements of stainless steel foil configured to define between said elements a plurality of honeycomb cells, said method comprising cleaning the surfaces of said stainless steel members by immersion in a mineral acid pickling solution followed by drying of said pickled members, assembling a composite sandwich consisting essentially of the top skin, a first layer of a first silver-base brazing alloy disposed in contact with said top skin, a first layer of a second silver-base brazing alloy disposed in contact with the first layer of said first brazing alloy, the honeycomb core disposed in contact with the first layer of said second brazing alloy, a second layer of the second brazing alloy disposed in contact with said honeycomb core, a second layer of the first brazing alloy disposed in contact with the second layer of said second brazing alloy and the bottom skin disposed in contact with the second layer of said first brazing alloy, said first brazing alloy having a flow temperature below the annealing temperature of said stainless steel and said second brazing alloy having a flow temperature at least 50° F. higher than said annealing temperature, said first and said second silver-base brazing alloys both containing between about 0.2% and 0.5% by weight of lithium and having compositions such that when said first brazing alloy is molten it will alloy with said second brazing alloy at a temperature below the annealing temperature of said stainless steel to form a self-fluxing third brazing alloy having a flow temperature no higher than said annealing temperature, heating the composite sandwich in a substantially non-oxidizing atmosphere to the annealing temperature of said stainless steel for at least about one-half hour to anneal said stainless steel and form said third brazing alloy, said third brazing alloy brazing said honeycomb sandwich together to form a brazed honeycomb structure in which the ratio of the average size of the top fillets to the average size of the bottom fillets is less than 1:3.

7. The method according to claim 6 in which the stainless steel is an iron alloy containing about 17% by weight of chromium, about 7% by weight of nickel and about 1% by weight of aluminum and having a conditioning temperature of about 1750° F.

8. The method according to claim 6 in which the first silver-base brazing alloy comprises about 92.5% by weight of Ag, 7% by weight of Cu and 0.5% by weight of Li, and said second silver-base alloy comprises about 84.5% by weight of Ag, 15% by weight of Mn and 0.5% by weight of Li.

9. The method according to claim 6 in which the third brazing alloy comprises about 88.5% by weight of Ag, 3.5% by weight of Cu, 7.5% by weight of Mn and 0.5% by weight of Li.

10. In the method of making a composite honeycomb structure comprising a metal top skin and a metal bottom skin separated from and connected to each other by a metal honeycomb core, the honeycomb core being formed from a plurality of mutually contacting corrugated metal honeycomb elements configured to define between said elements a plurality of honeycomb cells, said method comprising arranging the corrugated honeycomb elements so that the nodes of said elements are in contact with each other and have a brazing material disposed therebetween, temporarily securing said elements along their lines of mutual contact, and brazing said top and bottom skins to the adjacent edges of the honeycomb elements of said honeycomb core and brazing said honeycomb elements to one another along their lines of mutual contact, the improvement which comprises disposing a layer of a first self-fluxing brazing alloy against and in contact with the under surface of the top skin and a layer of said first brazing alloy against and in contact with the upper surface of the bottom skin of the honeycomb structure, disposing a layer of a second brazing alloy against and in contact with each of said layers of said first brazing alloy and the adjacent edges of the honeycomb elements of said honeycomb core, said second brazing alloy having a flow temperature of at least 50° F. higher than the flow temperature of the first brazing alloy, said first and second brazing alloys having compositions such that when said first brazing alloy is molten it will readily alloy with said second brazing alloy at a temperature below the flow temperature of said second brazing alloy to form a third self-fluxing brazing alloy having a flow temperature intermediate the flow temperatures of said first and second brazing alloys, and heating the honeycomb sandwich to a temperature above the flow temperatures of the first and the third brazing alloys and below the flow temperature of the second brazing alloy for a length of time sufficient to cause said layers of said self-fluxing alloy to thoroughly wet the adjacent surfaces of said top and bottom skins, and braze the several members of said honeycomb structure to each other.

References Cited in the file of this patent

UNITED STATES PATENTS

| | | |
|---|---|---|
| 2,195,314 | Lincoln | Mar. 26, 1940 |
| 2,804,285 | Peterson | Aug. 27, 1957 |
| 2,816,355 | Herman | Dec. 17, 1957 |
| 2,900,713 | Young | Aug. 25, 1959 |
| 2,910,153 | Campbell | Oct. 27, 1959 |
| 2,940,557 | Herbert | June 14, 1960 |